US011711813B2

(12) United States Patent
Islam et al.

(10) Patent No.: US 11,711,813 B2
(45) Date of Patent: Jul. 25, 2023

(54) DOWNLINK CONTROL CHANNEL SIGNALING FOR AN APERIODIC CHANNEL STATE INFORMATION TRIGGER

(71) Applicant: Intel Corporation, Santa Clara, CA (US)

(72) Inventors: Toufiqul Islam, Santa Clara, CA (US); Debdeep Chatterjee, San Jose, CA (US); Fatemeh Hamidi-Sepehr, Santa Clara, CA (US); Sergey Panteleev, Niz (RU)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 17/057,576

(22) PCT Filed: Aug. 10, 2019

(86) PCT No.: PCT/US2019/046074
§ 371 (c)(1),
(2) Date: Nov. 20, 2020

(87) PCT Pub. No.: WO2020/033937
PCT Pub. Date: Feb. 13, 2020

(65) Prior Publication Data
US 2021/0212033 A1    Jul. 8, 2021

Related U.S. Application Data

(60) Provisional application No. 62/717,689, filed on Aug. 10, 2018.

(51) Int. Cl.
*H04W 72/23* (2023.01)
*H04B 7/06* (2006.01)
(Continued)

(52) U.S. Cl.
CPC .......... *H04W 72/23* (2023.01); *H04B 7/0626* (2013.01); *H04L 1/0061* (2013.01); *H04L 5/0048* (2013.01)

(58) Field of Classification Search
CPC .. H04W 72/042; H04B 7/0626; H04L 1/0061; H04L 5/0048
See application file for complete search history.

(56) References Cited

U.S. PATENT DOCUMENTS

2015/0373674 A1    12/2015    Han et al.
2017/0156152 A1    6/2017    Nazar et al.
(Continued)

FOREIGN PATENT DOCUMENTS

WO    2018/031727 A1    2/2018

OTHER PUBLICATIONS

International Patent Office—International Search Report and Written Opinion dated Nov. 29, 2019 from International Application No. PCT/US2019/0546074, 11 pages.
(Continued)

*Primary Examiner* — Jackie Zuniga Abad
(74) *Attorney, Agent, or Firm* — Schwabe, Williamson & Wyatt, P.C.

(57) ABSTRACT

Embodiments described herein relate to downlink (DL) control channel signaling for an aperiodic channel state information (A-CSI) trigger. In one example, a user equipment (UE) communicates with a network to receive first configuration signaling to identify a first downlink control
(Continued)

information (DCI) in a physical downlink control channel (PDCCH). The UE also receives, from the network, the first DCI. The first DCI is appended with cyclic redundancy check (CRC) bits that are scrambled by a common radio network temporary identifier (RNTI) and is to indicate an aperiodic channel state information (A-CSI) trigger. Next, the UE receives, from the network, channel state information (CSI) reference signals in one or more occasions that follow an occasion in which the first DCI is received and generates and transmits a CSI report in a physical uplink control channel (PUCCH) based on the CSI reference signals.

21 Claims, 5 Drawing Sheets

(51) Int. Cl.
*H04L 1/00* (2006.01)
*H04L 5/00* (2006.01)

(56) References Cited

U.S. PATENT DOCUMENTS

| | | |
|---|---|---|
| 2017/0208568 A1 | 7/2017 | Nam et al. |
| 2018/0145851 A1 | 5/2018 | Kusashima et al. |
| 2019/0158205 A1* | 5/2019 | Sheng .................. H04B 7/0626 |
| 2019/0222349 A1* | 7/2019 | Gao ...................... H04L 1/1812 |
| 2019/0342907 A1* | 11/2019 | Huang .................. H04L 5/0048 |
| 2019/0357262 A1* | 11/2019 | Cirik .................... H04W 80/02 |
| 2020/0178240 A1* | 6/2020 | Zhang .................. H04L 1/0026 |

OTHER PUBLICATIONS

3GPP, "Technical Specification Group Radio Access Network; NR; Physical layer procedures for data (Release 15)," 3GPP TS 38.214 V15.2.0 (Jun. 2018), 5G, 94 pages.
3GPP, "Technical Specification Group Radio Access Network; NR; Physical layer procedures for control (Release 15)," 3GPP TS 38.213 V15.2.0 (Jun. 2018), 5G, 99 pages.

* cited by examiner

DOWNLINK CONTROL CHANNEL SIGNALING FOR AN APERIODIC CHANNEL STATE INFORMATION TRIGGER

RELATED APPLICATIONS

This application is a national phase entry under 35 U.S.C. § 371 of International Application No. PCT/US2019/046074, filed Aug. 10, 2019, entitled "DOWNLINK CONTROL CHANNEL SIGNALING FOR AN APERIODIC CHANNEL STATE INFORMATION TRIGGER," which claims priority under 35 U.S.C. § 119(e) to U.S. Provisional Application No. 62/717,689, filed Aug. 10, 2018, which are hereby incorporated by reference in their entireties.

FIELD

Embodiments generally relate to the field of wireless communications. More particularly, embodiments described herein relate to downlink (DL) control channel signaling for an aperiodic channel state information (A-CSI) trigger.

BACKGROUND

In cellular communication systems, channel state information (CSI) feedback is used to adjust the downlink (DL) transmissions so that subsequent transmissions can be made more reliable and/or higher data rate can be achieved given the channel conditions. New radio (NR) systems support a wide range of services, such as ultra-reliable low latency communications (URLLC). DL URLLC transmission may be sporadic, and the periodic CSI report cannot track the channel variation to adjust the scheduling in an efficient manner. If up-to-date CSI feedback is not available, a next generation NodeB (gNB) has to schedule the DL URLLC transmission in the most conservative way. For example, the allocated resources, modulation coding scheme (MCS) level, multiple input multiple output (MIMO) mode, transmission power, etc. for each transmission should be robust enough to meet the URLLC reliability requirements. This is inefficient from the resource usage point of view. For this reason, aperiodic CSI (A-CSI) can be triggered to obtain CSI feedback on an on-demand basis.

An existing mechanism to trigger A-CSI on a physical UL shared channel (PUSCH) is a CSI request bit field in a UL grant. The CSI request bit field can be from 0 to 6 bits determined by a higher layer parameter Report TriggerSize. However, users (e.g., a user equipment (UE), etc.) may often have no UL data in such cases, and hence, a gNB may have to transmit a UL grant to exclusively trigger an A-CSI report on the PUSCH without data. This technique is inefficient, and bundling an A-CSI report with a UL grant may unavoidably bring in more control resource consumption (and hence a large physical DL control channel (PDCCH) blocking probability) at the gNB as well as more DL control information (DCI) blind detections (and hence large power consumption and longer processing time) at the UE. On the other hand, A-CSI may be needed for DL-dominant slots to enable fast link adaption for URLLC.

BRIEF DESCRIPTION OF THE FIGURES

Embodiments described herein are illustrated by way of example and not limitation in the figures of the accompanying drawings, in which like references indicate similar features. Furthermore, in the figures, some conventional details have been omitted so as not to obscure from the inventive concepts described herein.

DETAILED DESCRIPTION

Embodiments described herein relate to downlink (DL) control channel signaling for an aperiodic channel state information (A-CSI) trigger. In one or more embodiments, an A-CSI trigger in a short physical uplink control channel (S-PUCCH) can be considered for quick and timely channel state information (CSI) acquisition and link adaption. Furthermore, embodiments described herein may be directed to DL control channel signaling to trigger A-CSI, in particular, DL group common control channel signaling. Embodiments described herein may also be directed to CSI feedback processing time.

In currently available techniques, a DL grant is only used when a packet is ready for transmission, hence an initial transmission may not benefit from CSI feedback. Moreover, triggering A-CSI based on UL grant DCI format 0_1 can be inefficient and bring in more control overhead. One or more embodiments described herein assist with overcoming one or more of the shortcomings of currently available techniques.

In one embodiment, a network may employ DL group common control signaling to trigger A-CSI. The group common control signal may have one or more user equipment (UE) specific fields, where in each respective field UE specific A-CSI trigger may be sent. Several advantages accrue from one or more of the embodiments described herein. One advantage is that UE specific fields in group common DCI may have few bits to indicate an A-CSI trigger setting. The overhead of signaling may be less than indicating the information in a full blown UL or DL grant in a UE specific manner. The network may use group common control signaling and an uplink (UL) grant in a complementary manner to trigger A-CSI depending on circumstances.

One or more of the embodiments set forth herein are directed to design details, and configuration of group common control channel signaling for triggering A-CSI. After monitoring and detecting CSI reference signals in configured resources, a UE reports A-CSI feedback in a physical uplink control channel (PUCCH) resource.

In what follows, various operations may be described as multiple discrete actions or operations, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," "A/B," "at least one of A or B," "at least one of A and B," "one or more of A and B," "one or more of A or B," and mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, including in the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 1:
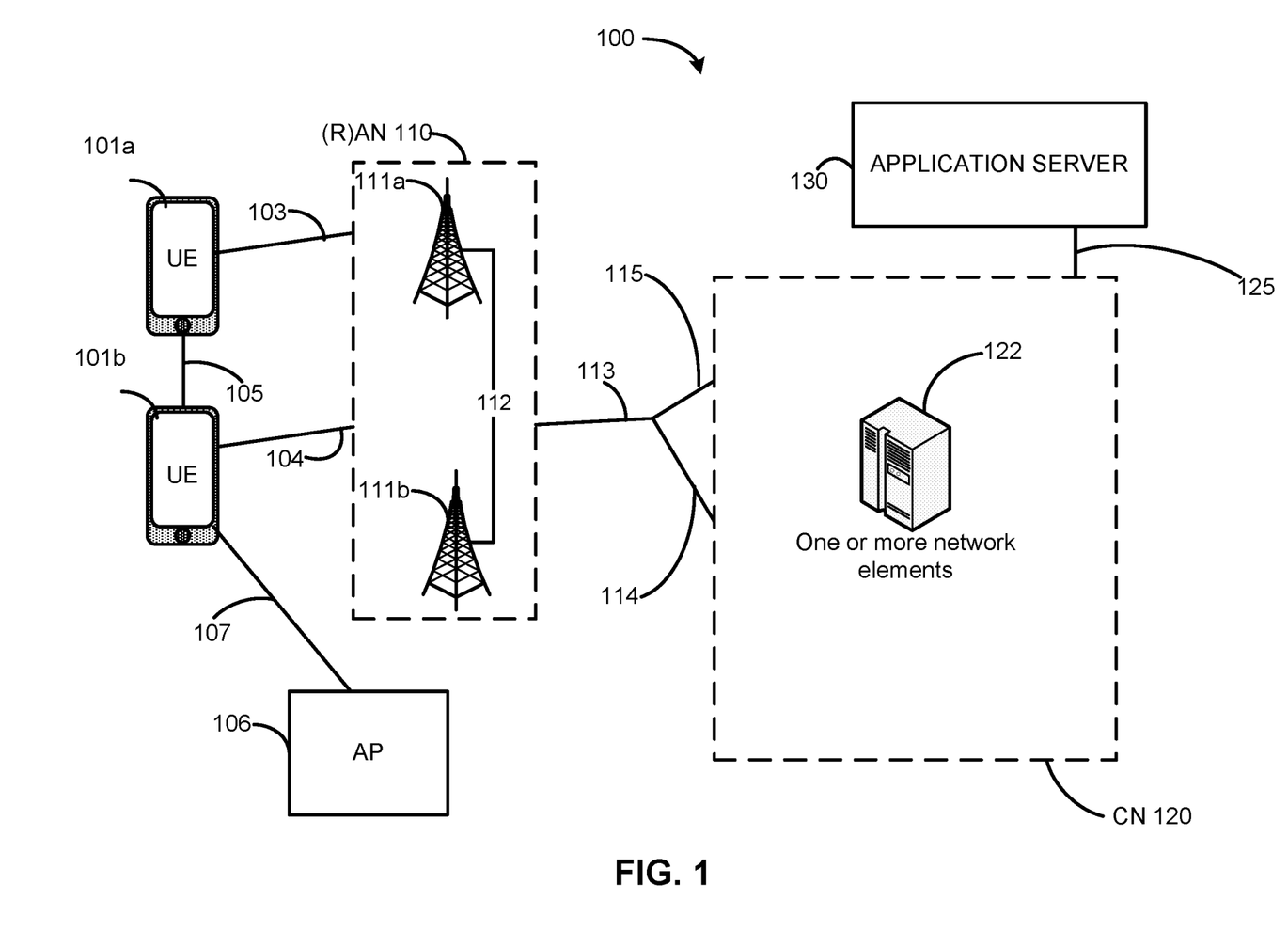
FIG. 1 illustrates an example architecture of a system of a network, in accordance with various embodiments.

FIG. 1 illustrates an example architecture of a system 100 of a network, in accordance with various embodiments. The following description is provided for an example system 100 that operates in conjunction with the as Long Term Evolution (LTE) system standards and the Fifth Generation (5G) or New Radio (NR) system standards as provided by 3rd Generation Partnership Project (3GPP) technical specifications (TS). However, the example embodiments are not limited in this regard and the described embodiments may apply to other networks that benefit from the principles described herein, such as future 3GPP systems (e.g., Sixth Generation (6G)) systems, Institute of Electrical and Electronics Engineers (IEEE) 802.16 protocols (e.g., Wireless metropolitan area networks (MAN), Worldwide Interoperability for Microwave Access (WiMAX), etc.), or the like.

As shown by FIG. 1, the system 100 may include user equipment (UE) 101a and UE 101b (collectively referred to as "UEs 101" or "UE 101"). As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, enhanced Machine Type Communication (eMTC), Narrowband IoT (NB-IoT), further enhanced narrowband internet-of-things (feNB-IoT), machine-to-machine (M2M), Internet-of-Things (IoT) devices, and/or the like.

In some embodiments, any of the UEs 101 can comprise an internet-of-things (IoT) UE, which may comprise a network access layer designed for low-power IoT applications utilizing short-lived UE connections. An IoT UE can utilize technologies such as M2M, eMTC, NB-IoT or MTC for exchanging data with an MTC server or device via a public land mobile network (PLMN), Proximity-Based Service (ProSe) or device-to-device (D2D) communication, sensor networks, or IoT networks. The M2M, eMTC, NB-IoT or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

Referring again to FIG. 1, the UEs 101 may be configured to connect, for example, communicatively couple, with a access network (AN) or radio access network (RAN) 110. In embodiments, the RAN 110 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Special Mobile) EDGE (GSM Evolution) Radio Access Network). As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 101 may directly exchange communication data via a ProSe interface 105. The ProSe interface 105 may alternatively be referred to as a sidelink (SL) interface 105 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 101b is shown to be configured to access an access point (AP) 106 (also referred to as also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 101b, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 101b in RRC_CONNECTED being configured by a RAN node 111 to utilize radio resources of LTE and WLAN. LWIP operation may involve the UE 101b using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." As used herein, the term "NG RAN node" or the like may refer to a RAN node 111 that operates in an NR or 5G system 100 (for example a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 111 may be implemented as one or more software entities running on server computers as part of a virtual network, which may be referred to as a cloud radio access network (CRAN). In other embodiments, the RAN nodes 111 may represent individual gNB-distributed units (DUs) that are connected to a gNB-centralized unit (CU) via an F1 interface (not shown by FIG. 1).

Any of the RAN nodes 111 can terminate the air interface protocol and can be the first point of contact for the UEs 101.

In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101. The physical downlink control channel (PDCCH) may carry information about the transport format and resource allocations related to the PDSCH channel, among other things. It may also inform the UEs 101 about the transport format, resource allocation, and H-ARQ (Hybrid Automatic Repeat Request) information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to six resource element groups (REGs). Each REG comprises one resource block in one OFDM symbol. The PDCCH can be transmitted using one or more CCEs, depending on the size of the downlink control information (DCI) and the channel condition. Different numbers of CCEs (e.g., aggregation level, L=1, 2, 4, 8 or 16) can be used for transmission of the PDCCH.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 111 may be configured to communicate with one another via interface 112. In embodiments where the system 100 is an LTE system, the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, Core Network (CN) 120. The CN 120 may comprise a plurality of network elements 122, which are configured to offer various data and telecommunications services to customers/subscribers (e.g., users of UEs 101) who are connected to the CN 120 via the RAN 110. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like.

Generally, the application server 130 may be an element offering applications that use IP bearer resources with the core network (e.g., UMTS Packet Services (PS) domain, LTE PS data services, etc.). The application server 130 can also be configured to support one or more communication services (e.g., Voice-over-Internet Protocol (VoIP) sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a user plane function (UPF), and the S1 control plane (NG-C) interface 115, which is a signaling interface between the RAN nodes 111 and Access and Mobility Functions (AMFs). Embodiments where the CN 120 is a 5GC 120 are discussed in more detail with regard to FIG. 3.

Figure 2:
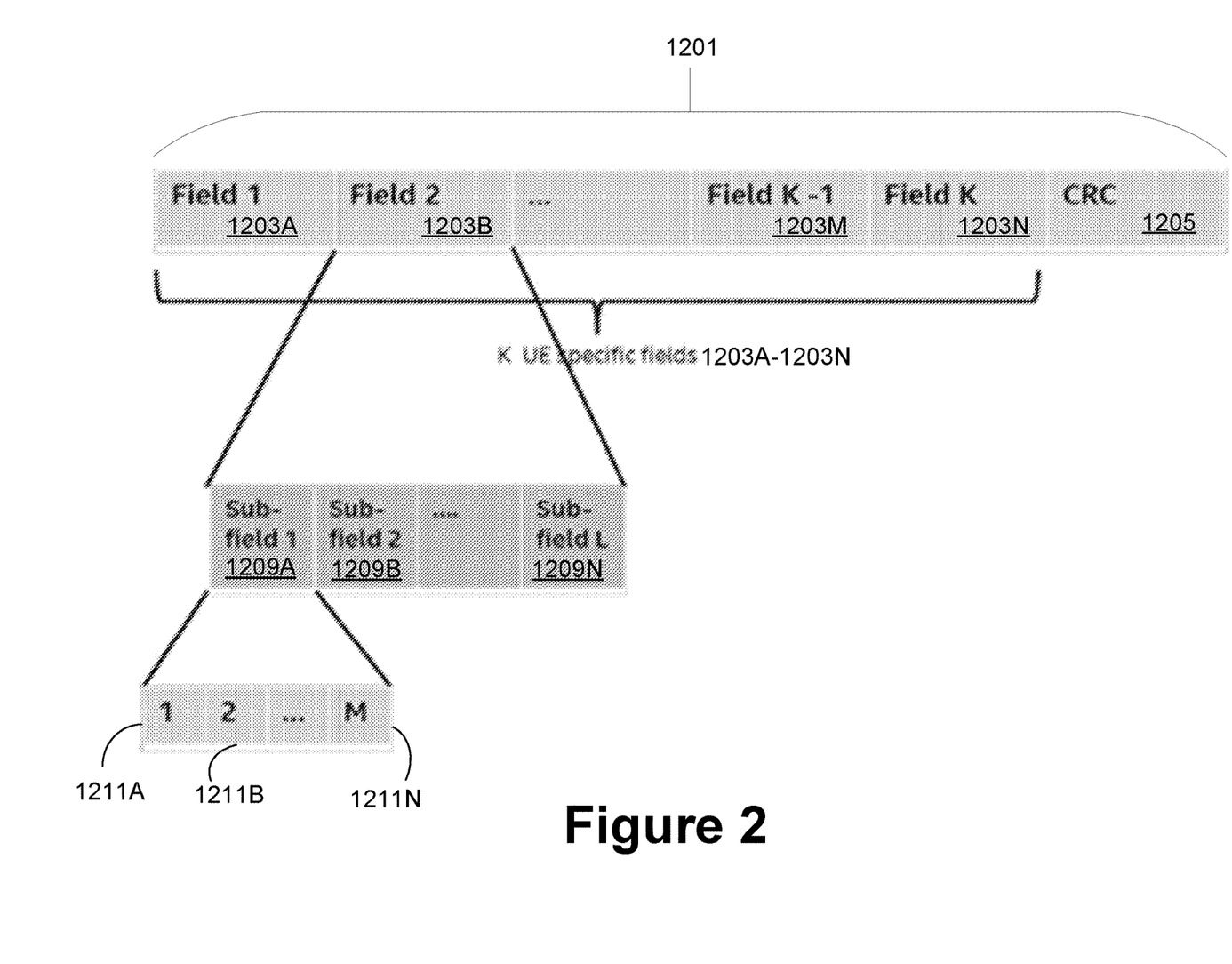
FIG. 2 is a block diagram illustrating a group common DCI (GC-DCI) format structure in a physical downlink control channel (PDCCH) with UE specific fields.

In embodiments, the CN 120 may be a 5G CN (referred to as "5GC 120" or the like), while in other embodiments, the CN 120 may be an Evolved Packet Core (EPC)). Where CN 120 is an EPC (referred to as "EPC 120" or the like), the RAN 110 may be connected with the CN 120 via an S1 interface 113. In embodiments, the S1 interface 13 may be split into two parts, an S1 user plane (S1-U) interface 114, which carries traffic data between the RAN nodes 111 and the serving gateway (S-GW), and the S1-mobility management entity (MME) interface 115, which is a signaling interface between the RAN nodes 111 and MMEs. An example architecture wherein the CN 120 is an EPC 120 is shown by FIG. 2.

The time and frequency resources that can be used by the UE (for example, UE 101) to report CSI are controlled by the next generation NodeB (gNB) (for example, RAN node 111). CSI feedback may include a Channel Quality Indicator (CQI), a precoding matrix indicator (PMI), a CSI reference signal (CSI-RS) resource indicator (CRI), a layer indication (LI), a rank indication (RI) and/or and a layer 1 L1-RSRP.

For CQI, PMI, CRI, LI, RI, L1-RSRP, a UE is configured by higher layers with $N \geq 1$ CSI-ReportConfig Reporting Settings, $M \geq 1$ CSI-ResourceConfig Resource Settings, and a list of trigger states ReportTriggerList containing a list of associated CSI-ReportConfigs indicating the Resource Set IDs for channel and optionally for interference.

In the case of an A-CSI trigger, the CSI-RS resource sets associated with Resource Settings configured with the higher layer parameter ResourceConfigType may be set to "aperiodic." The trigger states for Reporting Setting(s) and/or Resource Setting for channel and/or interference measurement on one or more component carriers may be configured using the higher layer parameter AperiodicReportTrigger. For aperiodic CSI report triggering, a single set of CSI triggering states may be higher layer configured, wherein the CSI triggering states can be associated with any candidate DL bandwidth part (BWP).

For each aperiodic CSI-RS resource associated with each CSI triggering state, the UE may be indicated the quasi co-location configuration of quasi co-location RS source(s) and quasi co-location type(s) through higher layer signalling of QCL-Info-AperiodicReportingTrigger which contains a list of references to TCI-RS-SetConfig's for the aperiodic CSI-RS resources associated with the CSI triggering state. If a TCI-RS-SetConfig in the list is configured with a reference to an RS associated with QCL-TypeD', that RS may be an SS/PBCH block located in the same or different component carrier (CC)/downlink (DL) BWP or a CSI-RS resource configured as periodic or semi-persistent located in the same or different CC/DL BWP.

For a UE configured with the higher layer parameter AperiodicReportTrigger, if a Resource Setting linked to a CSI-ReportConfig has multiple aperiodic resource sets and only one of the aperiodic CSI-RS resource sets is associated with the trigger state, a higher layer configured bitmap ResourceSetBitmap may be configured per trigger state per Resource Setting to select the CSI-IM/NZP CSI-RS resource set(s) from the Resource Setting.

For aperiodic CSI, each trigger state configured using the higher layer parameter ReportTrigger may be associated one or multiple CSI-ReportConfig where each CSI-ReportConfig is linked to periodic, or semi-persistent, or aperiodic resource setting(s):
- when one Resource Setting is configured, the Resource Setting is for channel measurement for L1-RSRP computation;
- when two Resource Settings are configured, the first one Resource Setting is for channel measurement and the second one is for interference measurement performed on CSI-IM or on NZP CSI-RS; and
- when three Resource Settings are configured, the first one resource setting is for channel measurement, the second one is for CSI-IM based interference measurement and the third one is for NZP CSI-RS based interference measurement.

Embodiments Directed to an A-CSI Trigger in GC-DCI

DCI Structure

FIG. 2 is a block diagram illustrating a group common DCI (GC-DCI) format structure 1201 with UE specific fields 1203A-1203N, according to one embodiment. As shown, the GC-DCI format structure 1201 comprises K≥1 fields (i.e., 1203A-1203N) that are configured in a UE-specific manner, where each field is for a UE, for example, a core network (CN) maps one or more UEs to respective fields 1203 that can be obtained via a prior higher layer signaling, such as radio resource control (RRC) signaling. K fields can potentially carry UE specific information for K respective UEs. Each UE specific field 1203A-1203N may have L≥1 sub-fields (i.e., 1209A-1209N), where each sub-field 1209A-1209N has M≥1 bits (i.e., 1211A-1211C). Hence, excluding the cyclic redundancy check (CRC) bits 1205, the DL control information (DCI) format 1201 has an overall number of bits that equals K×L×M, where there are L×M bits in each UE specific field and where each of K, L, and M is an integer.

DCI Content

In one example, each UE specific field 1203A-1203N has one bit, where the bit status 1 may trigger A-CSI, the bit status 0 does not trigger A-CSI, or vice versa. If a trigger is received, a UE may follow higher layer configured settings or trigger states for A-CSI reporting and an index that a PUCCH resource uses to transmit A-CSI. Optionally, an offset to a PUCCH resource location may also be indicated. The offset may be counted from an end of control resource set (CORESET), where the DCI is received or from the beginning of the slot where GC-DCI is received.

In another example, each of the UE specific fields 1203A-1203N, corresponds to a different UE, and the contents may trigger A-CSI reporting for multiple UEs, simultaneously. Accordingly, when each UE specific field 1203A-1203N has one bit, a bitmap can be indicated in the common DCI to trigger the corresponding UEs.

In one example, a UE specific field (e.g., any one of UE specific fields 1203A-1203N) may contain one or more sub-fields to dynamically indicate one or more parameters associated with A-CSI reporting, such as CSI triggering states, CSI-RS configuration identify including CSI for interference measurement and zero-power CSI, number of CQI for reporting, associated CQI table and block error rate (BLER) target, sub-band size, etc. and a PUCCH resource, such as an index of a PUCCH resource and/or offset to the start position of PUCCH where a UE reports CSI. A UE can be configured with a set of PUCCH resources through higher-layer signaling and then indicated by the DCI in the sub-field (e.g., any one of sub-fields 1209A-1209N) to select one PUCCH resource to report A-CSI. In one example, a sub-set of PUCCH resource sets used for dynamic indication in the sub-field (e.g., any one of sub-fields 1209A-1209N) may only consist of PUCCH resources that do not exceed two symbols in length, e.g., A-CSI feedback may be transmitted in a PUCCH spanning no longer than two symbols.

In one example, at least one sub-field (e.g., any one of sub-fields 1209A-1209N) of the UE specific content/field (e.g., any one of UE specific fields 1203A-1203N) indicates a CSI triggering state. The sub-field (e.g., any one of sub-fields 1209A-1209N) may be called CSI request field. In one example, the sub-field (e.g., any one of sub-fields 1209A-1209N) may have NTS number of bits. Hence, this bit-field can be used to indicate one CSI triggering state from $2^{NTS}-1$ supported CSI triggering states. When the number of configured CSI triggering states in an AperiodicReportTrigger parameter is greater than $2^{NTS}-1$, the UE receives a selection command used to map up to $2^{NTS}-1$ trigger states to the codepoints of the CSI request field in DCI. NTS≥1 is configured by the higher layer parameter ReportTriggerSize. In one example, NTS∈{0, 1, 2, 3, 4, 5, 6}. When the number of CSI triggering states in the AperiodicReportTrigger parameter is less than or equal to $2^{NTS}-1$, the CSI request field in the DCI directly indicates the triggering state and the UE's quasi co-location assumption.

In one example, when aperiodic CSI-RS is used with aperiodic reporting, the CSI-RS offset is configured per resource set by a higher layer parameter or offset can be dynamically indicated in the triggering DCI.

In one example, A-CSI may only be triggered for wide-band CQI reporting to limit payload. In one example, the CSI Reporting Setting may have a wideband frequency-granularity instead of sub-band based granularity.

In one example, A-CSI is triggered when CSI Reporting Setting has a sub-band based granularity. In one example, the UE may be configured to report a worst sub-band based on CQI measurements.

Embodiments Directed to Monitoring Configuration for the DCI

In one example, a UE maps to one or more fields 1203A-1203N in the GC-DCI having the format 1201 according to higher layer configuration. In another example, a UE may not always monitor for the GC-DCI 1201 and may only do so after receiving a trigger, either dynamically or semi-statically.

The DCI format, e.g., DCI format 2_x, x>3, that triggers A-CSI in a GC-DCI have the format 1201 may be associated with a configured radio network temporary identifier (RNTI), e.g, ACSI_RNTI. The configured RNTI can be a common RNTI for a group of UEs that monitor the DCI format 1201. For each DL bandwidth part (BWP) of a serving cell where a UE is configured to monitor the GC-DCI in a PDCCH for A-CSI trigger in a search space, the UE is configured by one or more of the following using a higher layer parameter search-space-config:

an association between a search space set index s, 0≤s≤S, where S≤10, and a control resource set index p;

for the search space set s in the control resource setp:

an indication that the search space set is a common search space set or a UE-specific search space set by higher layer parameter Common-search-space-flag.

if the search space set s is for a common search space, an indication by higher layer parameter RNTI-monitoring to monitor PDCCH for DCI format 2_x scrambled by a configured RNTI such as ACSI-RNTI;

if the search space set s is a UE-specific search space, an indication by higher layer parameter USS-DCI-format to monitor PDCCH for DCI format 2_x;

a number of PDCCH candidates $M_{p,s}^{(L)}$ per CCE aggregation level L by higher layer parameters aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively;

a PDCCH monitoring periodicity of $k_{p,s}$, slots by higher layer parameter monitoringSlotPeriodicityAndOffset;

a PDCCH monitoring offset of $O_{p,s}$ slots, where $0 \leq O_{p,s} \leq k_{p,s}$, by higher layer parameter monitoringSlotPeriodicityAndOffset; and a PDCCH monitoring pattern within a slot, indicating first symbol(s) of the control resource set within a slot for PDCCH monitoring, by higher layer parameter monitoringSymbolsWithinSlot.

Minimum Processing Times for CSI Feedback

When the CSI request field on a DCI triggers a CSI report(s) on PUSCH, the UE may provide valid CSI report(s) if:

the first UL symbol to carry the corresponding CSI report(s) including the effect of the timing advance (TA), starts no earlier than at symbol $Z_{ref}$, where $Z_{ref}$ is defined as the next UL symbol with its cyclic prefix (CP) starting after $((Z+d)(2048+144) \cdot k2^{-\mu}) \cdot T_c$ after the end of the last symbol of the PDCCH triggering the CSI report; and the first UL symbol to carry the corresponding CSI report including the effect of the timing advance, starts no earlier than at symbol $Z'_{ref}$, where $Z'_{ref}$ is defined as the next UL symbol with its cyclic prefix (CP) starting after $((Z'+d)(2048+144) \cdot k2^{-\mu}) \cdot T_c$ after the end of the last symbol in time of: the last symbol of aperiodic CSI-RS resource for channel measurements, the last symbol of aperiodic CSI-IM used for interference measurements, and the last symbol of aperiodic NZP CSI-RS for interference measurement, when aperiodic CSI-RS is used for channel measurement for triggered CSI report n.

When the CSI request field on a DCI triggers CSI report(s) on a physical uplink shared channel (PUSCH), if the first UL symbol to carry the corresponding CSI report(s) including the effect of the timing advance, starts no earlier than at symbol $Z_{ref}$, then:

the UE may ignore the scheduling DCI if no HARQ-ACK or transport block is multiplexed on the PUSCH; or the UE drops the CSI for the triggered CSI reports if either HARQ-ACK or transport block is multiplexed on the PUSCH.

When the CSI request field on a DCI triggers a CSI report(s) on PUSCH, if the first uplink symbol to carry the corresponding CSI report including the effect of the timing advance, starts no earlier than at symbol $T_{ref}$, then:

the UE may ignore the scheduling DCI if the number of triggered reports is one and no HARQ-ACK or transport block is multiplexed on the PUSCH; and Otherwise, the UE is not required to update the CSI for the triggered CSI report n.

Z and Z' are defined as:

$Z=\max(Z_m)_{m=0 \ldots M-1}$ and $Z'=\max(Z'_m)_{m=0 \ldots M-1}$, where M is the number of updated CSI report(s) and $(Z_m, Z'_m)$ corresponds to the m-th requested CSI report and is defined as:

$(Z_1, Z'_1)$ of the table 1 set forth below when the CSI is triggered without a PUSCH with either transport block or HARQ-ACK or both when L=0 CPUs are occupiedand the CSI to be transmitted corresponds to wideband frequency-granularity where the CSI corresponds to at most four CSI-RS ports in a single resource without a CRI report and where a CodebookType parameter is set to 'TypeI-SinglePanel' or where a reportQuantity parameter is set to 'cri-RI-CQI'; or $(Z_1, Z'_1)$ of the table 2 set forth below when the CSI is triggered without a PUSCH with either a transport block or HARQ-ACK or both and the CSI to be transmitted corresponds to wideband frequency-granularity where the CSI corresponds to at most 4 CSI-RS ports in a single resource without CRI report and where CodebookType is set to 'TypeI-SinglePanel' or where reportQuantity is set to 'cri-RI-CQI'; or If reportQuantity is set to 'cri-RSRP' or 'ssb-Index-RSRP', Z'm is according to UE reported capability and in is FFS; or $(Z_2, Z'_2)$ of the table 2 set forth below otherwise.

μ of tables 1 and 2, which are set forth below, corresponds to the min $(\mu_{PDCCH}, \mu_{USI-RS}, \mu_{UL})$, where the $\mu_{PDCCH}$ corresponds to the subcarrier spacing of the PDCCH with which the DCI was transmitted, $\mu_{UL}$ corresponds to the subcarrier spacing of the PUSCH with which the CSI report is to be transmitted, and $\mu_{CSI-RS}$ corresponds to the minimum subcarrier spacing of the aperiodic CSI-RS triggered by the DCI.

d=0 if the CSI is not multiplexed with a PUSCH with either a transport block or HARQ-ACK of both. If CSI is multiplexed with a PUSCH with either a transport block or HARQ-ACK of both, d=2 for, μ=0, 1, d=3 for μ=2 and d=3 for μ=4.

TABLE 1

CSI computation delay requirement 1

| | $Z_1$ [symbols] | |
|---|---|---|
| μ | $Z_1$ | $Z'_1$ |
| 0 | [9 or 10] | [7 or 8] |
| 1 | 13 | 11 |
| 2 | 25 | 21 |
| 3 | 43 | 36 |

TABLE 2

CSI computation delay requirement 2

| | $Z_1$ [symbols] | | $Z_2$ [symbols] | |
|---|---|---|---|---|
| μ | $Z_1$ | $Z'_1$ | $Z_2$ | $Z'_2$ |
| 0 | 22 | 16 | 40 | 37 |
| 1 | 33 | 30 | 72 | 69 |
| 2 | 44 | 42 | 141 | 140 |
| 3 | 97 | 85 | 152 | 140 |

In new radio release 15 (Rel-15) aperiodic CSI feedback is carried on a PUSCH and triggered by a DL DCI format. For the case of A-CSI feedback using PUCCH, in one or more embodiments, the corresponding minimum computation time for CSI processing and reporting may be same as that defined for A-CSI on PUSCH but with no UL-SCH but with or without HARQ-ACK information.

Furthermore, in an example, the Z1 values may correspond to delay requirement 1 as described in Table 1, which is set forth above, implying assumption on L=0 (i.e., no occupied CSI processing units).

For the above, in another example wherein the UE is expected to report CSI feedback along with HARQ-ACK the Zref and Z'ref parameters may be defined with d=1.

In one or more embodiments, for new CSI definition that may be based on the scheduled PDSCH DMRS or based on PDSCH (and or PDCCH) demodulation information, $Z'_{ref}$ is defined as the the next uplink symbol with its CP starting after $((Z'+d)(2048+144) \cdot k2^{-\mu}) \cdot T_c$ after the end of the last symbol in time of: the last symbol of the scheduled PDSCH in addition to or as an alternative to {the last symbol of aperiodic CSI-RS resource for channel measurements, the last symbol of aperiodic CSI-IM used for interference measurements, and the last symbol of aperiodic NZP CSI-RS for interference measurement, when aperiodic CSI-RS is used for channel measurement for triggered CSI report n}. Moreover, the values of Z' may be redefined considering possibly new definition of CSI.

Figure 3:
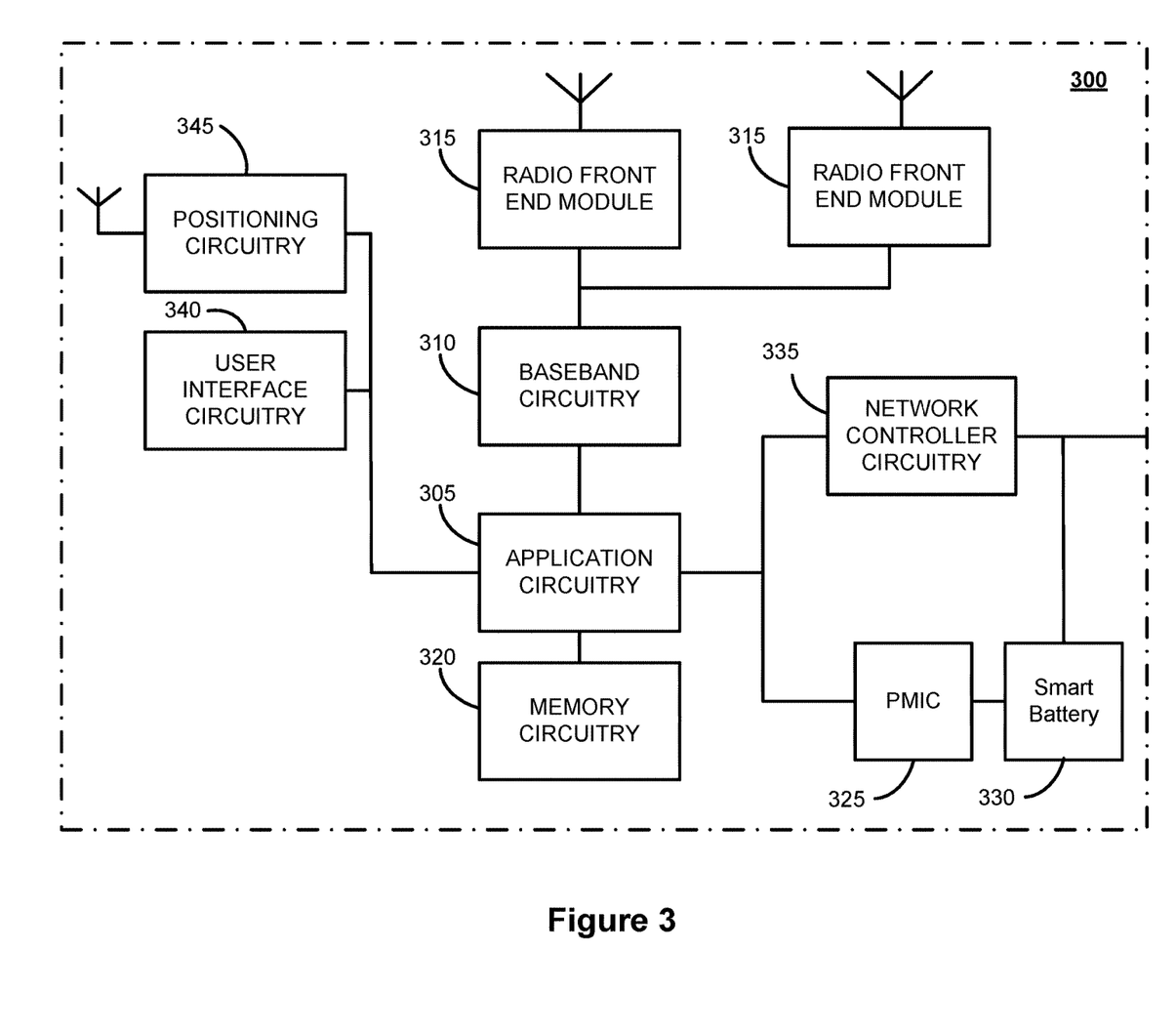
FIG. 3 illustrates a device in accordance with some embodiments.

FIG. 3 illustrates an example of equipment 300 in accordance with various embodiments. The equipment 300 (or "system 300") may be implemented in a UE or network device as shown and described previously. The system 300 may include one or more of application circuitry 305, baseband circuitry 310, one or more radio front end modules 315, memory circuitry 320, power management integrated circuitry (PMIC) 325, power tee circuitry 330, network controller circuitry 335, network interface connector 340, satellite positioning circuitry 345, and user interface 350. In some embodiments, the device 300 may include additional elements such as, for example, memory/storage, display, camera, sensor, or input/output (I/O) interface.

The term "circuitry" may refer to, be a part of, or include hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 305 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or TO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 305 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 300 may not utilize application circuitry 305, and instead may include a special-purpose processor/controller to process IP data received from an EPC or 4GC, for example.

Additionally or alternatively, application circuitry 305 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may comprise logic blocks or logic fabric, and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. Although not shown, baseband circuitry 310 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 310 may include protocol processing circuitry with one or more instances of control circuitry (not shown) to provide control functions for the digital baseband circuitry and/or radio frequency circuitry (e.g., the radio front end modules 315).

User interface circuitry 350 may include one or more user interfaces designed to enable user interaction with the system 300 or peripheral component interfaces designed to enable peripheral component interaction with the system 300.

The radio front end modules (RFEMs) 315 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 315. The RFEMs 315 may incorporate both millimeter wave antennas and sub-millimeter wave antennas.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor.

The network controller circuitry 335 may provide connectivity to a network using a standard network interface protocol such as Ethernet, Ethernet over GRE Tunnels, Ethernet over Multiprotocol Label Switching (MPLS), or some other suitable protocol.

The positioning circuitry 345 may include circuitry to receive and decode signals transmitted by one or more navigation satellite constellations of a global navigation satellite system (GNSS).

The components shown by FIG. 3 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 4:
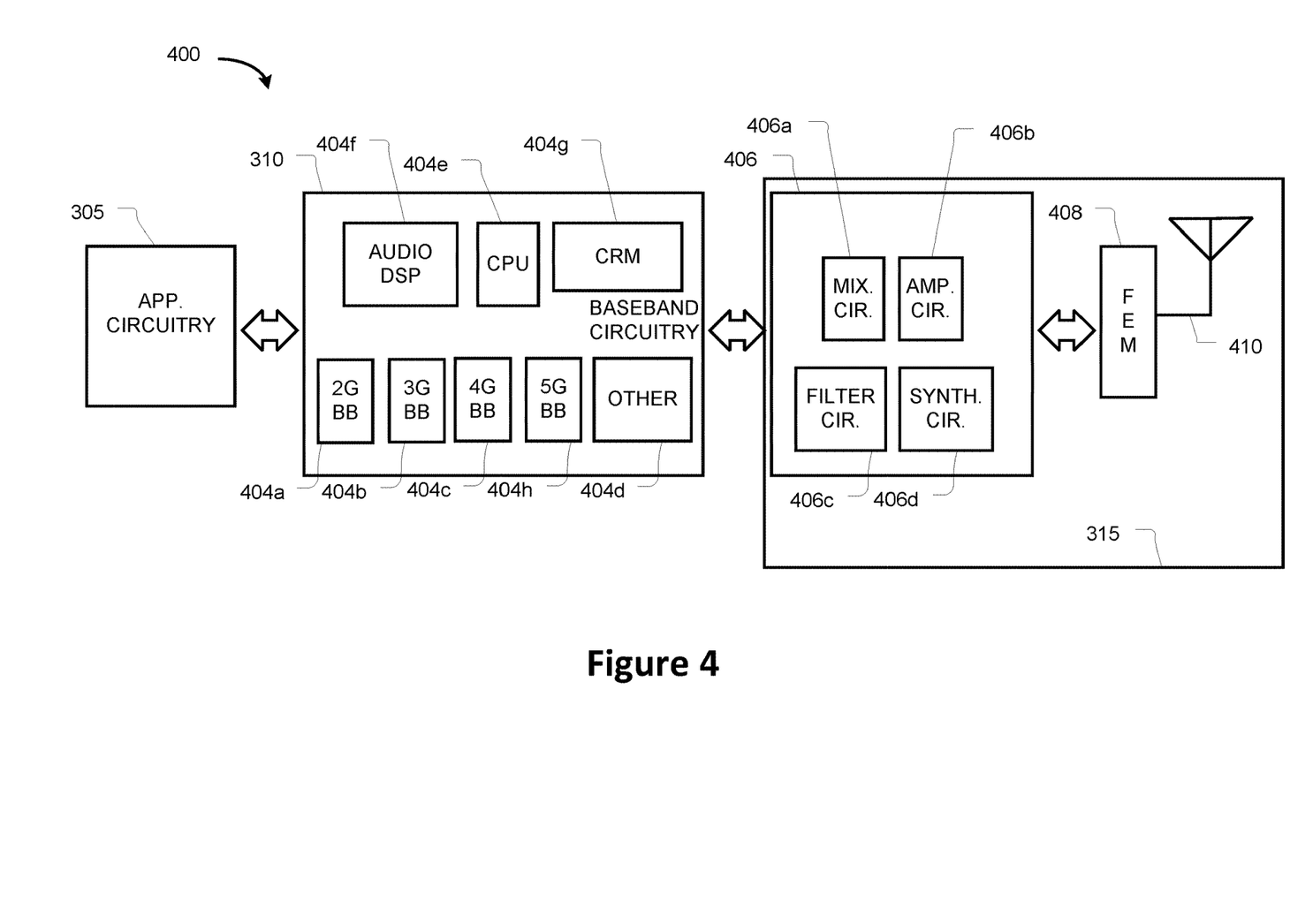
FIG. 4 illustrates example components of a device in accordance with some embodiments.

FIG. 4 illustrates example components of baseband circuitry 310 and radio front end modules (RFEM) 315 in accordance with various embodiments. As shown, the RFEMs 315 may include Radio Frequency (RF) circuitry 406, front-end module (FEM) circuitry 408, one or more antennas 411 coupled together at least as shown.

The baseband circuitry 310 may include circuitry such as, but not limited to, one or more single-core or multi-core processors. The baseband circuitry 310 may include one or more baseband processors or control logic to process baseband signals received from a receive signal path of the RF circuitry 406 and to generate baseband signals for a transmit signal path of the RF circuitry 406. Baseband processing circuitry 310 may interface with the application circuitry 305 for generation and processing of the baseband signals and for controlling operations of the RF circuitry 406. For example, in some embodiments, the baseband circuitry 310 may include a third generation (3G) baseband processor 404A, a 3G baseband processor 404B, a 4G baseband processor 404C, or other baseband processor(s) 404D for other existing generations, generations in development or to be developed in the future (e.g., second generation (2G), sixth generation (6G), etc.). The baseband circuitry 310 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 310 may include Fast-Fourier Transform (FFT), precoding, or constellation mapping/demapping functionality. In some embodiments, encoding/decoding circuitry of the baseband circuitry 310 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 310 may include one or more audio digital signal processor(s) (DSP) 404F. The audio DSP(s) 404F may include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 310 and the application circuitry 305 may be implemented together such as, for example, on a system on a chip (SOC).

In some embodiments, the baseband circuitry 310 may provide for communication compatible with one or more radio technologies. For example, in some embodiments, the baseband circuitry 310 may support communication with an E-UTRAN or other WMAN, a WLAN, a WPAN. Embodiments in which the baseband circuitry 310 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path, which may include circuitry to down-convert RF signals received from the FEM circuitry 408 and provide baseband signals to the baseband circuitry 310. RF circuitry 406 may also include a transmit signal path, which may include circuitry to up-convert baseband signals provided by the baseband circuitry 310 and provide RF output signals to the FEM circuitry 408 for transmission.

In some embodiments, the receive signal path of the RF circuitry 406 may include mixer circuitry 406a, amplifier circuitry 406b and filter circuitry 406c. In some embodiments, the transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 310 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 310 and may be filtered by filter circuitry 406c.

In some embodiments, the mixer circuitry 406a of the receive signal path and the mixer circuitry 406a of the transmit signal path may include two or more mixers and may be arranged for quadrature downconversion and upconversion, respectively.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 310 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage controlled oscillator (VCO FEM circuitry 408 may include a receive signal path, which may include circuitry configured to operate on RF signals received from one or more antennas 411, amplify the received signals and provide the amplified versions of the received signals to the RF circuitry 406 for further processing. FEM circuitry 408 may also include a transmit signal path, which may include circuitry configured to amplify signals for transmission provided by the RF circuitry 406 for transmission by one or more of the one or more antennas 411. In various embodiments, the amplification through the transmit or receive signal paths may be done solely in the RF circuitry 406, solely in the FEM circuitry 408, or in both the RF circuitry 406 and the FEM circuitry 408.

In some embodiments, the FEM circuitry 408 may include a TX/RX switch to switch between transmit mode and receive mode operation. The FEM circuitry 408 may include a receive signal path and a transmit signal path.

Processors of the application circuitry 305 and processors of the baseband circuitry 310 may be used to execute elements of one or more instances of a protocol stack. For example, processors of the baseband circuitry 310, alone or in combination, may be used execute Layer 3, Layer 2, or Layer 1 functionality, while processors of the application circuitry 305 may utilize data (e.g., packet data) received from these layers and further execute Layer 3 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 5:
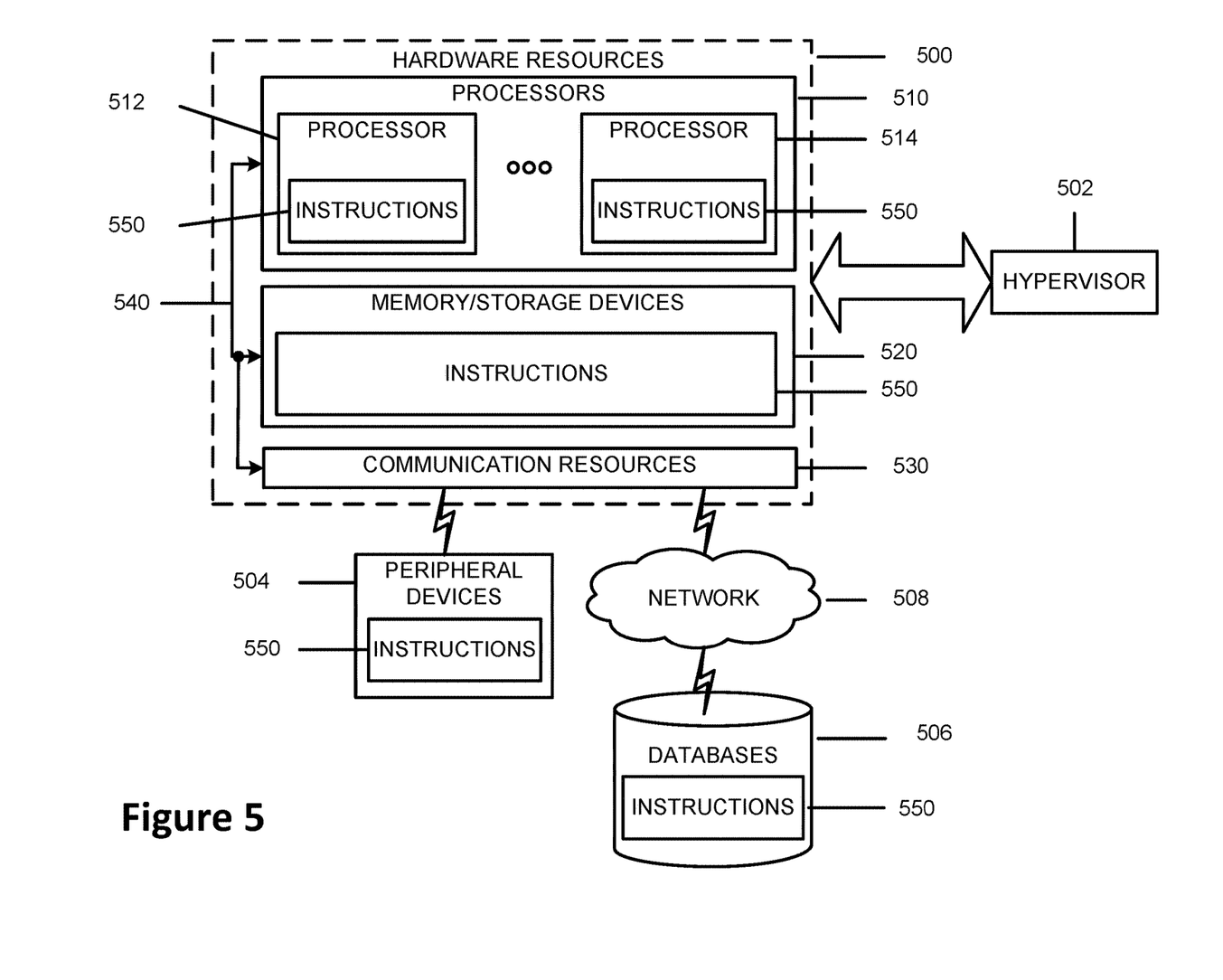
FIG. 5 illustrates components of an electronic device in accordance with some embodiments

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 502 may be executed to provide an execution environment for one or more network slices/sub-slices to utilize the hardware resources 500. A "virtualized resource" may refer to compute, storage, and/or network resources provided by virtualization infrastructure to an application, device, system, etc.

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

The examples set forth herein are illustrative not exhaustive.

Example 1 may include one or more computer-readable media having instructions that, when executed, cause a user equipment (UE) to: receive first configuration signaling to identify a first downlink control information (DCI) in a physical downlink control channel (PDCCH); monitor a common search space for detecting the first DCI; receive the first DCI, wherein the first DCI is appended with cyclic redundancy check (CRC) bits that are scrambled by a common radio network temporary identifier (RNTI) and is to indicate an aperiodic channel state information (A-CSI) trigger; receive channel state information (CSI) reference signals in one or more occasions that follow an occasion in which the first DCI is received; and generate and transmit a CSI report in a physical uplink control channel (PUCCH) resource based on the CSI reference signals.

Example 2 may include the one or more computer-readable storage media of example 1 or some other example herein, wherein the first configuration signaling comprises a UE specific radio resource control (RRC) signaling.

Example 3 may include the one or more computer-readable storage media of any one of examples 1-2 or some other example herein, wherein the first DCI is to indicate the PUCCH resource Example 4 may include the one or more computer-readable storage media of any one of examples 1-3 or some other example herein, wherein the PUCCH resource is configured by higher layer signaling.

Example 5 may include the one or more computer-readable storage media of any one of examples 1-4 or some other example herein, wherein the PUCCH resource spans at least one symbol.

Example 6 may include the one or more computer-readable storage media of any one of examples 1-5 or some other example herein, wherein the PUCCH resource spans no more than two symbols.

Example 7 may include the one or more computer-readable storage media of any one of examples 1-6 or some other example herein, wherein the first DCI is to indicate a CSI triggering state from a plurality of supported triggering states.

Example 8 may include the one or more computer-readable storage media of any one of examples 1-7 or some other example herein, wherein the instructions that, when executed, cause the UE to generate and transmit the CSI report in a PUCCH resource based on the CSI reference signals include additional instructions that, when executed, further cause the UE to: generate and transmit the CSI based on wideband measurement.

Example 9 may include the one or more computer-readable storage media of any one of examples 1-8 or some other example herein, wherein the RNTI is configured by higher layer signaling.

Example 10 may include an apparatus to implement a user equipment (UE), the apparatus comprising: interface circuitry configured to transmit and receive messages; and processing circuitry, coupled with the interface circuitry, configured to: receive, via the interface circuitry, first configuration signaling to identify a first downlink control information (DCI) in a physical downlink control channel (PDCCH); receive, via the interface circuitry, the first DCI, wherein the first DCI is appended with cyclic redundancy check (CRC) bits that are scrambled by a common radio network temporary identifier (RNTI) and is to indicate an aperiodic channel state information (A-CSI) trigger; receive, via the interface circuitry, channel state information (CSI) reference signals in one or more occasions that follow an occasion in which the first DCI is received; and generate and transmit, via the interface circuitry, a CSI report in a physical uplink control channel (PUCCH) based on the CSI reference signals.

Example 11 may include the apparatus of example 10 or some other example, wherein the first configuration signaling comprises a UE specific radio resource control (RRC) signaling.

Example 12 may include the apparatus of any one of examples 10-11 or some other example herein, wherein the first DCI is to indicate a PUCCH resource.

Example 13 may include the apparatus of example 12 or some other example herein, wherein the PUCCH resource spans at least one symbol.

Example 14 may include the apparatus of any one of examples 12-13 or some other example herein, wherein the PUCCH resource spans no more than two symbols.

Example 15 may include the apparatus of any one of examples 10-14, wherein the first DCI is to indicate a CSI triggering state from a plurality of supported triggering states.

Example 16 may include the apparatus of any one of examples 10-15, wherein processor being configured to generate and transmit the CSI report in a PUCCH based on the CSI reference signals is further configured to: generate and transmit the CSI based on wideband measurement.

Example 17 may include an apparatus comprising one or more baseband processors coupled to a central processing unit (CPU), the apparatus comprising means for causing a user equipment (UE) to: receive first configuration signaling to identify a first downlink control information (DCI) in a physical downlink control channel (PDCCH); receive the first DCI, wherein the first DCI is appended with cyclic redundancy check (CRC) bits that are scrambled by a common radio network temporary identifier (RNTI) and is to indicate an aperiodic channel state information (A-CSI) trigger; receive channel state information (CSI) reference signals in one or more occasions that follow an occasion in which the first DCI is received; and generate and transmit a CSI report in a physical uplink control channel (PUCCH) based on the CSI reference signals.

Example 18 may include the apparatus of example 17 or some other example herein, wherein the first configuration signaling comprises a UE specific radio resource control (RRC) signaling.

Example 19 may include the apparatus of any one of examples 17-18 or some other example herein, wherein the first DCI is to indicate a PUCCH resource.

Example 20 may include the apparatus of example 19 or some other example herein, wherein the PUCCH resource spans at least one symbol.

Example 21 may include the apparatus of any one of examples 19-20 or some other example herein, wherein the PUCCH resource spans no more than two symbols.

Example 22 may include the apparatus of any one of examples 17-21 or some other example herein, wherein the first DCI is to indicate a CSI triggering state from a plurality of supported triggering states.

Example 23 may include the apparatus of any one of examples 17-22, wherein means for causing a user equipment (UE) to generate and transmit the CSI report in a PUCCH based on the CSI reference signals further comprises means for causing a user equipment (UE) to: generate and transmit the CSI based on wideband measurement.

Example 24 may include one or more computer-readable media having instructions that, when executed, cause a network to: transmit first configuration signaling identifying a first downlink control information (DCI) in a physical downlink control channel (PDCCH); transmit the first DCI, wherein the first DCI is appended with cyclic redundancy check (CRC) bits that are scrambled by a common radio network temporary identifier (RNTI) and is to indicate an aperiodic channel state information (A-CSI) trigger; transmit channel state information (CSI) reference signals in one or more occasions that follow an occasion in which the first DCI is received; and receive a CSI report in a physical uplink control channel (PUCCH) based on the CSI reference signals.

Example 25 may include the one or more computer-readable media of example 24 or some other example herein, wherein the first DCI is to indicate a CSI triggering state from a plurality of supported triggering states.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

One or more of the embodiments set forth herein may be implemented in a non-transitory computer readable medium, an apparatus, a user equipment (UE), a base station (e.g., a gNB, etc.), circuitry associated with a UE, circuitry associated with a base station, baseband circuitry, etc.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. One or more non-transitory computer-readable media having instructions that, when executed, configure a user equipment (UE) to:
receive configuration signaling to identify a downlink control information (DCI) in a physical downlink control channel (PDCCH);
identify a received DCI, wherein the DCI is appended with cyclic redundancy check (CRC) bits that are scrambled by a common radio network temporary identifier (RNTI), and wherein the DCI includes:
a first UE-specific sub-field related to the UE, wherein the first UE-specific sub-field includes a first indication that the UE is to transmit an aperiodic channel state information (A-CSI) report and a second indication of a channel state information (CSI) triggering state that is selected from a first number of possible triggering states, wherein the first number of possible triggering states is one less than a number of bits of the first UE-specific sub-field; and
a second UE-specific sub-field related to a second UE, wherein the second UE-specific sub-field includes a third indication that the second UE is not to transmit an A-CSI report and a fourth indication of a CSI triggering state this is selected from a second number of possible triggering states, wherein the second number of possible triggering states is one less than a number of bits of the second UE-specific sub-field;
identify one or more CSI reference signals (CSI-RSs) in one or more occasions that follow an occasion in which the DCI is received; and
generate and transmit, based on the indication in the first UE-specific sub-field, an A-CSI report in a physical uplink control channel (PUCCH) resource based on the CSI-RSs.

2. The one or more non-transitory computer-readable storage media of claim 1, wherein the configuration signaling comprises a UE specific radio resource control (RRC) signaling.

3. The one or more non-transitory computer-readable storage media of claim 1, wherein the DCI is to indicate the PUCCH resource.

4. The one or more non-transitory computer-readable storage media of claim 1, wherein the PUCCH resource is configured by higher layer signaling.

5. The one or more non-transitory computer-readable storage media of claim 1, wherein the first UE-specific sub-field is a single bit.

6. The one or more non-transitory computer-readable storage media of claim 1, wherein the PUCCH resource spans no more than two symbols.

7. The one or more non-transitory computer-readable storage media of claim 1, wherein the A-CSI report is generated and transmitted based on wideband measurement.

8. The one or more non-transitory computer-readable storage media of claim 1, wherein the RNTI is configured by higher layer signaling.

9. An apparatus to implement a user equipment (UE), the apparatus comprising:
interface circuitry configured to transmit and receive messages; and
processing circuitry, coupled with the interface circuitry, configured to:
receive, via the interface circuitry, first configuration signaling that identifies a downlink control information (DCI) in a physical downlink control channel (PDCCH);
receive, via the interface circuitry, the DCI, wherein the DCI is appended with cyclic redundancy check (CRC) bits that are scrambled by a common radio network temporary identifier (RNTI), and wherein the DCI includes:
a first UE-specific sub-field related to the UE, wherein the first UE-specific sub-field includes a first indication that the UE is to transmit an aperiodic channel state information (A-CSI) report and a second indication of a channel state information (CSI) triggering state that is selected from a first number of possible triggering states, wherein the first number of possible triggering states is one less than a number of bits of the first UE-specific sub-field; and
a second UE-specific sub-field related to a second UE, wherein the second UE-specific sub-field includes a third indication that the second UE is not to transmit an A-CSI report and a fourth indication of a CSI triggering state this is selected from possible triggering states, wherein the second number of possible triggering states is one less than a number of bits of the second UE-specific sub-field;
receive, via the interface circuitry, one or more CSI reference signals (CSI-RSs) in one or more occasions that follow an occasion in which the DCI is received; and
generate and transmit, via the interface circuitry and based on the indication in the first UE-specific sub-field, an A-CSI report in a physical uplink control channel (PUCCH) based on the one or more CSI-RSs.

10. The apparatus of claim 9, wherein the configuration signaling comprises a UE specific radio resource control (RRC) signaling.

11. The apparatus of claim 9, wherein the DCI is to indicate a PUCCH resource.

12. The apparatus of claim 11, wherein the PUCCH resource spans at least one symbol.

13. The apparatus of claim 11, wherein the PUCCH resource spans no more than two symbols.

14. The apparatus of claim 9, wherein the A-CSI report is generated and transmitted based on wideband measurement.

15. An apparatus comprising means for causing a user equipment (UE) to:
receive configuration signaling to identify a downlink control information (DCI) in a physical downlink control channel (PDCCH);
identify a received DCI, wherein the DCI is appended with cyclic redundancy check (CRC) bits that are scrambled by a common radio network temporary identifier (RNTI), and wherein the DCI includes:
a first UE-specific sub-field related to the UE, wherein the first UE-specific sub-field includes a first indication that the UE is to transmit an aperiodic channel state information (A-CSI) report and a second indication of a channel state information (CSI) triggering state that is selected from a first number of possible triggering states, wherein the first number of possible triggering states is one less than a number of bits of the first UE-specific sub-field; and
a second UE-specific sub-field related to a second UE, wherein the second UE-specific sub-field includes a third indication that the second UE is not to transmit an A-CSI report and a fourth indication of a CSI triggering state this is selected from a second number of possible triggering states, wherein the second number of possible triggering states is one less than a number of bits of the second UE-specific sub-field;
identify one or more CSI reference signals (CSI-RSs) in one or more occasions that follow an occasion in which the DCI is received; and
generate and transmit, based on the indication in the first UE-specific sub-field, an A-CSI report in a physical uplink control channel (PUCCH) based on the one or more CSI-RSs.

16. The apparatus of claim 15, wherein the configuration signaling comprises a UE specific radio resource control (RRC) signaling.

17. The apparatus of claim 15, wherein the DCI is to indicate a PUCCH resource.

18. The apparatus of claim 17, wherein the PUCCH resource spans at least one symbol.

19. The apparatus of claim 17, wherein the PUCCH resource spans no more than two symbols.

20. The apparatus of claim 15, wherein means for causing a user equipment (UE) to generate and transmit the A-CSI report in a PUCCH further comprises means for causing a user equipment (UE) to:
generate and transmit the A-CSI report based on wideband measurement.

21. One or more non-transitory computer-readable media having instructions that, when executed, cause a network device to:
transmit configuration signaling identifying a downlink control information (DCI) in a physical downlink control channel (PDCCH);
transmit the DCI, wherein the DCI is appended with cyclic redundancy check (CRC) bits that are scrambled by a common radio network temporary identifier (RNTI), and wherein the DCI includes:
a first UE-specific sub-field related to the UE, wherein the first UE-specific sub-field includes a first indication that the UE is to transmit an aperiodic channel state information (A-CSI) report and a second indication of a channel state information (CSI) triggering state that is selected from a first number of possible triggering states, wherein the first number of possible triggering states is one less than a number of bits of the first UE-specific sub-field; and
a second UE-specific sub-field related to a second UE, wherein the second UE-specific sub-field includes a third indication that the second UE is not to transmit an A-CSI report and a fourth indication of a CSI triggering state this is selected from a second number of possible triggering states, wherein the second number of possible triggering states is one less than a number of bits of the second UE-specific sub-field;
transmit one or more CSI reference signals (CSI-RSs) in one or more occasions that follow an occasion in which the DCI is transmitted; and
identify, UE based on the indication in the first UE-specific sub-field, a CSI report received from the first UE in a physical uplink control channel (PUCCH) based on the one or more CSI-RSs.

* * * * *